United States Patent
Wang et al.

(10) Patent No.: US 9,604,345 B2
(45) Date of Patent: Mar. 28, 2017

(54) HARD-FACING FOR DOWNHOLE TOOLS AND MATRIX BIT BODIES WITH ENHANCED WEAR RESISTANCE AND FRACTURE TOUGHNESS

(71) Applicant: National Oilwell DHT, L.P., Conroe, TX (US)

(72) Inventors: Ying Wang, The Woodlands, TX (US); Wesley Craig Arceneaux, Sr., Spring, TX (US); Jiinjen Albert Sue, The Woodlands, TX (US); Harold A. Sreshta, Conroe, TX (US)

(73) Assignee: NATIONAL OILWELL DHT, L.P., Conroe, TX (US)

( * ) Notice: Subject to any disclaimer, the term of this patent is extended or adjusted under 35 U.S.C. 154(b) by 666 days.

(21) Appl. No.: 14/070,003

(22) Filed: Nov. 1, 2013

(65) Prior Publication Data

US 2015/0122552 A1    May 7, 2015

(51) Int. Cl.
| | |
|---|---|
| *B24D 3/34* | (2006.01) |
| *C22C 29/08* | (2006.01) |
| *E21B 10/55* | (2006.01) |
| *C01B 31/34* | (2006.01) |
| *C04B 35/628* | (2006.01) |
| *C04B 35/626* | (2006.01) |
| *E21B 17/10* | (2006.01) |
| *C22C 1/05* | (2006.01) |
| *B22F 5/00* | (2006.01) |

(52) U.S. Cl.
CPC ............... *B24D 3/34* (2013.01); *C01B 31/34* (2013.01); *C04B 35/6268* (2013.01); *C04B 35/6286* (2013.01); *C04B 35/62675* (2013.01); *C04B 35/62897* (2013.01); *C22C 1/051* (2013.01); *C22C 1/056* (2013.01); *C22C 29/08* (2013.01); *E21B 10/55* (2013.01); *E21B 17/1085* (2013.01); *B22F 2005/001* (2013.01); *C04B 2235/424* (2013.01); *C04B 2235/524* (2013.01); *C04B 2235/528* (2013.01); *C04B 2235/5276* (2013.01); *C04B 2235/5292* (2013.01); *C04B 2235/5296* (2013.01); *C04B 2235/5427* (2013.01)

(58) Field of Classification Search
CPC ........... B24D 3/34; C22C 1/056; C22C 1/051; C22C 29/08; E21B 10/55; E21B 17/1085; C01B 31/34; C04B 35/62897; C04B 35/62675; C04B 35/6268; C04B 35/6286; Y10T 428/2982
USPC .............................. 428/403; 175/428; 51/307
See application file for complete search history.

(56) References Cited

U.S. PATENT DOCUMENTS

| | | |
|---|---|---|
| 7,541,090 B2 | 6/2009 | Gerk |
| 8,220,566 B2 | 7/2012 | Eason et al. |
| 2007/0079905 A1* | 4/2007 | Gerk ..................... B22F 1/0011 148/237 |
| 2009/0263646 A1* | 10/2009 | Gerk ..................... B22F 1/0011 428/328 |

OTHER PUBLICATIONS

Dai Yu et al. "Influence of fabricating process on microstructure and properties of spheroidal cast tungsten carbide powder", Trans. Nonferrous Met. Soc. China, vol. 15, No. 2, Apr. 2005.*
Alonso, F.C. Nava, et al., "Tungsten Trioxide Reduction-Carburization with Carbon Monoxide-Carbon Dioxide Mixtures: Kinetics and Thermodynamics," International Journal of Mineral Processing, vol. 20 (1987) pp. 137-151, Elsevier Science Publishers B.V., Amsterdam, The Netherlands (15 p.).
Bonache, V., et al., "Synthesis and Processing of Nanocrystalline Tungsten Carbide: Towards Cemented Carbides with Optimal Mechanical Properties," International Journal of Refractory Metals and Hard Materials, vol. 29 (2011) pp. 78-84 (7 p.).

\* cited by examiner

*Primary Examiner* — Leszek Kiliman
(74) *Attorney, Agent, or Firm* — Conley Rose, P.C.

(57) ABSTRACT

A composite material and a methods of making and using the composite material, wherein the composite material provides improved wear resistance and fracture toughness to hard-facing and matrix materials for down hole drilling tools.

36 Claims, 9 Drawing Sheets

HARD-FACING FOR DOWNHOLE TOOLS AND MATRIX BIT BODIES WITH ENHANCED WEAR RESISTANCE AND FRACTURE TOUGHNESS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

The present disclosure relates generally to hard-facing for downhole tools and earth-boring drill bits used to drill a borehole for the ultimate recovery of oil, gas, or minerals. More particularly, the invention relates to matrix bit bodies, and hardfacing for downhole tools with improved wear (erosion) resistance and fracture toughness.

An earth-boring drill bit is typically mounted on the lower end of a drill string and is rotated by rotating the drill string at the surface or by actuation of downhole motors or turbines, or by both methods. With weight applied to the drill string, the rotating drill bit engages the earthen formation and proceeds to form a borehole along a predetermined path toward a target zone. The borehole thus created will have a diameter generally equal to the diameter or "gage" of the drill bit.

The cost of drilling a borehole for recovery of hydrocarbons is very high, and is proportional to the length of time it takes to drill to the desired depth and location. The time required to drill the well, in turn, is affected by the number of times the drill bit must be changed before reaching the targeted formation. This is the case because each time the bit is changed, the entire string of drill pipe, which may be miles long, must be retrieved from the borehole, section by section. Once the drill string has been retrieved and the new bit installed, the bit must be lowered to the bottom of the borehole on the drill string, which again must be constructed section by section. This process, known as a "trip" of the drill string, requires considerable time, effort and expense. Accordingly, it is desirable to employ drill bits that will drill faster and longer. The length of time that a drill bit may be employed before it must be changed depends upon a variety of factors, including the bit's rate of penetration ("ROP"), as well as its durability or ability to maintain a high or acceptable ROP. In turn, ROP and durability are dependent upon a number of factors, including the ability of the bit body to resist abrasion, erosion, and impact loads.

Figure 1:
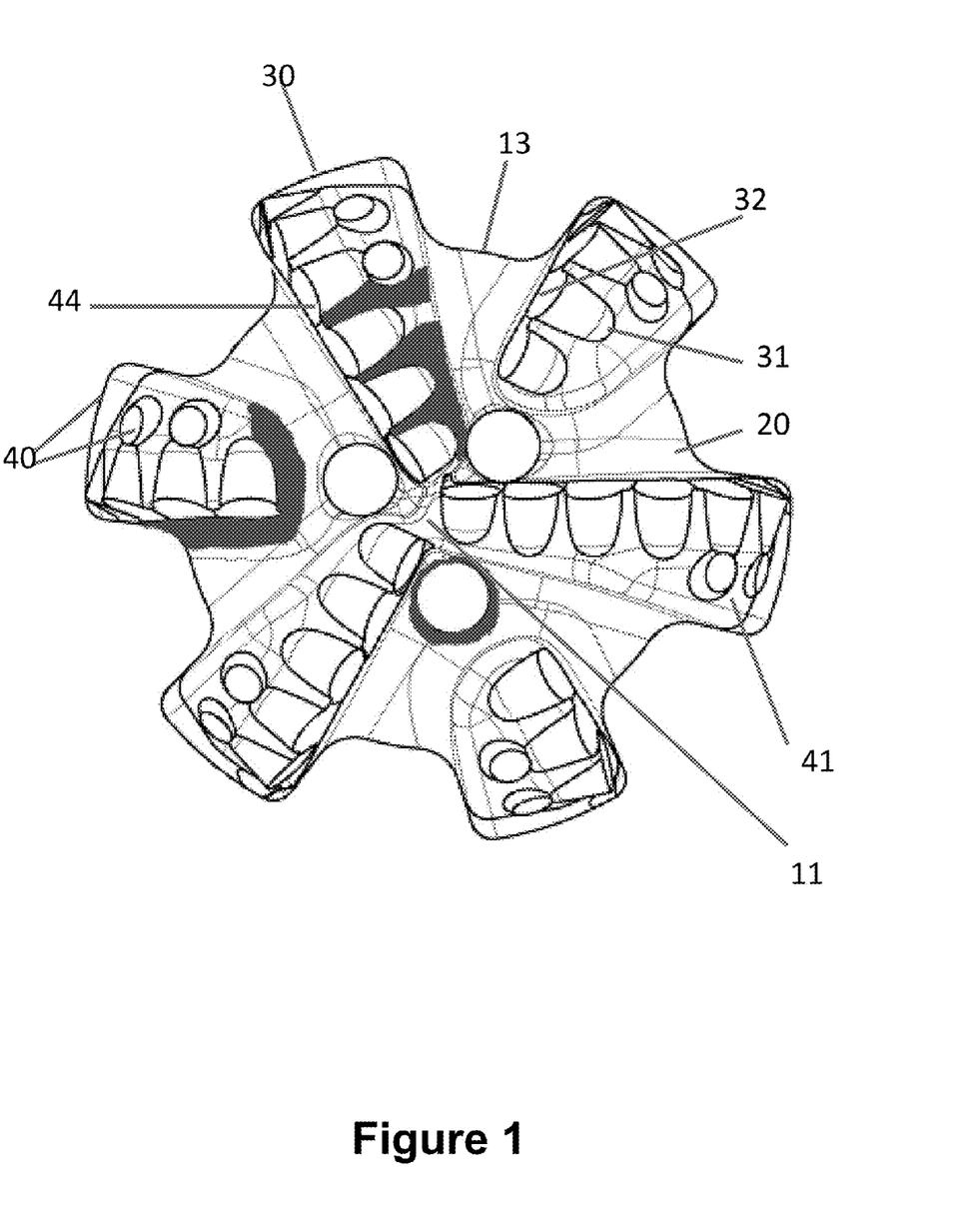
FIG. 1 is an end view of a conventional fixed cutter bit illustrating the regions of localized erosion and wear on the bit face, as indicated by the shaded areas.

Two predominant types of drill bits are roller cone bits and fixed cutter bits, also known as rotary drag bits. FIG. 1 illustrates a typical fixed cutter (FC) bit 10 for drilling through formations of rock to form a borehole. Bit 10 has a central axis 11 about which bit 10 rotates in the cutting direction. In addition, bit 10 includes a bit body 13 and a bit face 20 formed on the end of the bit body 12 (not visible in this perspective) that faces the formation. Bit body 10 can be formed from steel or from a composite material referred to as "matrix." A cutting structure 21 is provided on the bit face 20 and includes six blades 30 integrally formed as part of, and extending from, bit body 12 and bit face 20. Each blade 30 has a formation facing cutter-supporting surface 31 for mounting a plurality of cutter elements 32 thereto. Each cutter element 32 has a cutting face 44 attached to an elongated and generally cylindrical support member or substrate that is received and secured in a pocket formed in the corresponding surface 31. A plurality of gage pads 40 are disposed about the circumference of bit 10 at angularly spaced locations. Each gage pad 40 is integrally formed as part of the bit body 12 and extends from one blade 30. The radially outer gage pads 40 abuts the borehole sidewall during drilling to help maintain the size of the borehole and stabilize bit 10 against vibration.

Bit performance is often limited by selective/localized erosive damage to the bit body. In FIG. 1, localized regions that typically experience erosion and wear during drilling operations are shown shaded on bit 10, such as is experienced for example at the side wall of the blade. Excessive erosion and wear in such regions can alter and negatively affect specific design parameters for optimal cutting and hydraulic flow paths. For example, excessive localized erosion and wear can alter cutter exposure (i.e., extension height of cutter elements). In addition, excessive erosion and wear around cutter elements (e.g., cutter elements 32) can increase the likelihood of such cutter elements being broken off or otherwise removed from the bit during drilling operations.

To improve the wear resistance of steel bit bodies, a protective coating, often referred to as hard-facing, can be applied to the base metal (steel) of the bit body. The hard-facing is a harder material than the base metal, and thus, enhances abrasion resistance. The durability, and hence effectiveness, of hard-facing applied to a steel bit body is dependent on the coating integrity. In particular, coating failure and exposure of the steel body can lead to accelerated erosive or wear damage effecting bit performance and dull condition of bit.

The propensity of steel body bits to experience erosive damage when in service has been a primary reason for the use of matrix bit bodies for fixed cutter bits. Such matrix bit bodies typically are formed by integrally bonding or welding to a steel blank in a hard particulate (or hardphase) material volume, such as particles of WC (tungsten carbide), $WC/W_2C$ (cast carbide) or mixtures of both, and infiltrating the hardphase with a infiltrant binder (or infiltrant), and forming a composite matrix bit body. The composite matrix bit body is removed from the mold and secured to a steel shank having a threaded end adapter to mate with the end of the drill string. PDC cutters are then bonded to the face of the bit in pockets that were cast.

Cast carbide pellets ($WC/W_2C$ eutectic) formed from spherical or angular particles (macrostructure) are commonly used in hard-facing for drill bits and downhole tools, whereas cast carbide pellets ($WC/W_2C$ eutectic) formed from non-spherical particles (macrostructure) are often added to a matrix bit body for ease of infiltration. However, some degree of dissolution of $WC/W_2C$ pellets into Ni-, Co-, or Fe-alloy matrix of the hard-facing is observed, which leads to an increase in matrix hardness and can cause cracking in the hard-facing. For non-spherical cast carbide, at infiltration temperatures of greater than 2000° F., $WC/W_2C$ particles can be completely dissolve into Cu—Ni—Mn—Zn alloy of bit matrix and degrade its mechanical properties, leading to a lower fracture toughness for the bit body. The temperatures experienced down hole can often exceed the 2000° F. threshold, potentially resulting in unreliable performance, and in some cases, failure of the hard-facing and matrix bit bodies.

BRIEF SUMMARY OF THE DISCLOSED EMBODIMENTS

These and other needs in the art are addressed in one embodiment of the present invention by a composite material comprising: a first material, wherein the first material comprises an elongated microstructure of less than about 2 microns in thickness, with an aspect ratio of about 10 to about 100; and a second material, wherein the second material comprises a shell around said first material, wherein said shell is about 0.1 micron to about 35 micron in thickness. In another embodiment of the composite material the first material is a eutectic mixture of WC and $W_2C$; in a further embodiment of the composite material, the first material comprises about 10% WC to about 40% WC; and in a still further embodiment, the first material comprises about 20% WC to about 37% WC. In one embodiment of the composite material herein disclosed, the first material comprises about 50% $W_2C$ to about 65% $W_2C$, in another embodiment of the composite material the first material comprises about 55% $W_2C$ to about 62% $W_2C$. In a further embodiment of the composite material, the first material comprises about 3.8 wt. % to about 4.2 wt. % of carbon.

In one embodiment of the composite material herein disclosed, the first material comprises an inner core structure; in another embodiment the inner core is spherical; and in a further embodiment the inner core structure comprises an elongated microstructure; and wherein the elongated microstructure is needle like or a plate like.

In one embodiment of the composite material herein disclosed the second material comprises WC, in another embodiment of the composite material herein disclosed, the composite material comprises a Vickers hardness of 1800 to 3000. In another embodiment the composite material comprises a Vickers hardness of 1800 to 2200.

In one embodiment, a method of making a composite material is disclosed, wherein the method comprises: mixing: a carbide material, wherein the carbide material comprises needles of less than about 2 microns in thickness, and with an aspect ratio of about 10 to about 100; and a carbon rich material, to form a first mixture; heating the mixture under vacuum at less than about 1300 degrees F.; and cooling the mixture under vacuum to form a composite material. In another embodiment of the method of making a composite material, the carbide material is eutectic $WC/W_2C$, in a further embodiment, the carbide material comprises about 55 wt. % $W_2C$ to about 62% $W_2C$.

In another embodiment of the method of making a composite material, wherein the carbide material comprises about 20% WC to about 37% WC. In another embodiment of the method of making a composite material, the carbide material further comprises spherical particles, and in another embodiment, the spherical particles are about 50 microns to 1200 microns in size.

In one embodiment of the method of making a composite material, the carbon rich material is at least one of: air, a carbon rich gas; CO, CO2, $CO/CO_2$, alkanes, alkenes, coarse carbon black, fine carbon black, or combinations thereof; in another embodiment, the carbon rich material is fine carbon black, in a further embodiment, the fine carbon black comprises about 1 wt % to about 4 wt. % of the mixture, and in a further still embodiment the fine carbon black is about 0.1 microns to about 100 microns in size.

In one embodiment of the method of making a composite material, heating is for about 1 to about 24 hrs, and in another embodiment, heating is for less than about 8 hrs.

One embodiment of the method of making a composite material, further comprises after the mixing step, placing the mixture in an inert vessel.

In one embodiment of the method of making a composite material, the composite material comprises a spherical inner core structure; and further comprises an outer shell, wherein the shell is about 1 micron to about 35 microns thick, in another embodiment about 2 micron to about 10 microns thick; in another embodiment, the shell is about 5 microns to about 7 microns thick. In a further embodiment of the method of making a composite material, the shell comprises WC.

In one embodiment of the method of making a composite material, the spherical inner core structure comprises $WC/W_2C$, in another embodiment the spherical inner core structure comprises a needle like or a plate like microstructure; in a further embodiment, the spherical inner core structure is about 50 microns to about 1200 microns in size; and in a further still embodiment, the spherical inner core structure is about 100 microns to about 300 microns in size. In another embodiment of the method of making a composite material, the spherical inner core structure has a Vickers hardness number of greater than 2000, and the shell has a Vickers hardness number of 1800 to 3000, in another embodiment the shell has a Vickers hardness number of 1800 to 2200. In one embodiment of the method of making a composite material, the composite material is a matrix drill body, and in a further embodiment, the composite material is a hard-facing surface.

In one embodiment a drill bit for drilling a borehole in earthen formations, is herein disclosed, wherein the drill bit comprises a bit body having a composite material comprising; a first material, wherein the first material comprises needles of less than about 2 microns in thickness, and with an aspect ratio of about 10 to about 100; and a second material, wherein the second material comprises a shell around said first material, wherein the shell is about 0.1 micron to about 35 micron, and in a further embodiment wherein the shell is about 0.1 micron to about 10 micron.

Embodiments described herein comprise a combination of features and advantages intended to address various shortcomings associated with certain prior devices, systems, and methods. The foregoing has outlined rather broadly the features and technical advantages of the invention in order that the detailed description of the invention that follows may be better understood. The various characteristics described above, as well as other features, will be readily apparent to those skilled in the art upon reading the following detailed description, and by referring to the accompanying drawings. It should be appreciated by those skilled in the art that the conception and the specific embodiments disclosed may be readily utilized as a basis for modifying or designing other structures for carrying out the same purposes of the invention. It should also be realized by those skilled in the art that such equivalent constructions do not depart from the spirit and scope of the invention as set forth in the appended claims.

BRIEF DESCRIPTION OF THE DRAWINGS

For a detailed description of the disclosed embodiments of the invention, reference will now be made to the accompanying drawings, wherein.

DETAILED DESCRIPTION OF THE DISCLOSED EMBODIMENTS

The following discussion is directed to various exemplary embodiments of the invention. However, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and that the scope of this disclosure, including the claims, is not limited to that embodiment.

The drawing figures are not necessarily to scale. Certain features and components herein may be shown exaggerated in scale or in somewhat schematic form and some details of conventional elements may be omitted in interest of clarity and conciseness.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices, components, and connections. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis. As used herein, the term "about," when used in conjunction with a percentage or other numerical amount, means plus or minus 10% of that percentage or other numerical amount. For example, the term "about 80%," would encompass 80% plus or minus 8%. The term crystal and grain may be used interchangeably to describe some embodiments of the microstructure of materials described herein.

Downhole Tool/Bit Including Hard-Facing

Figure 2:
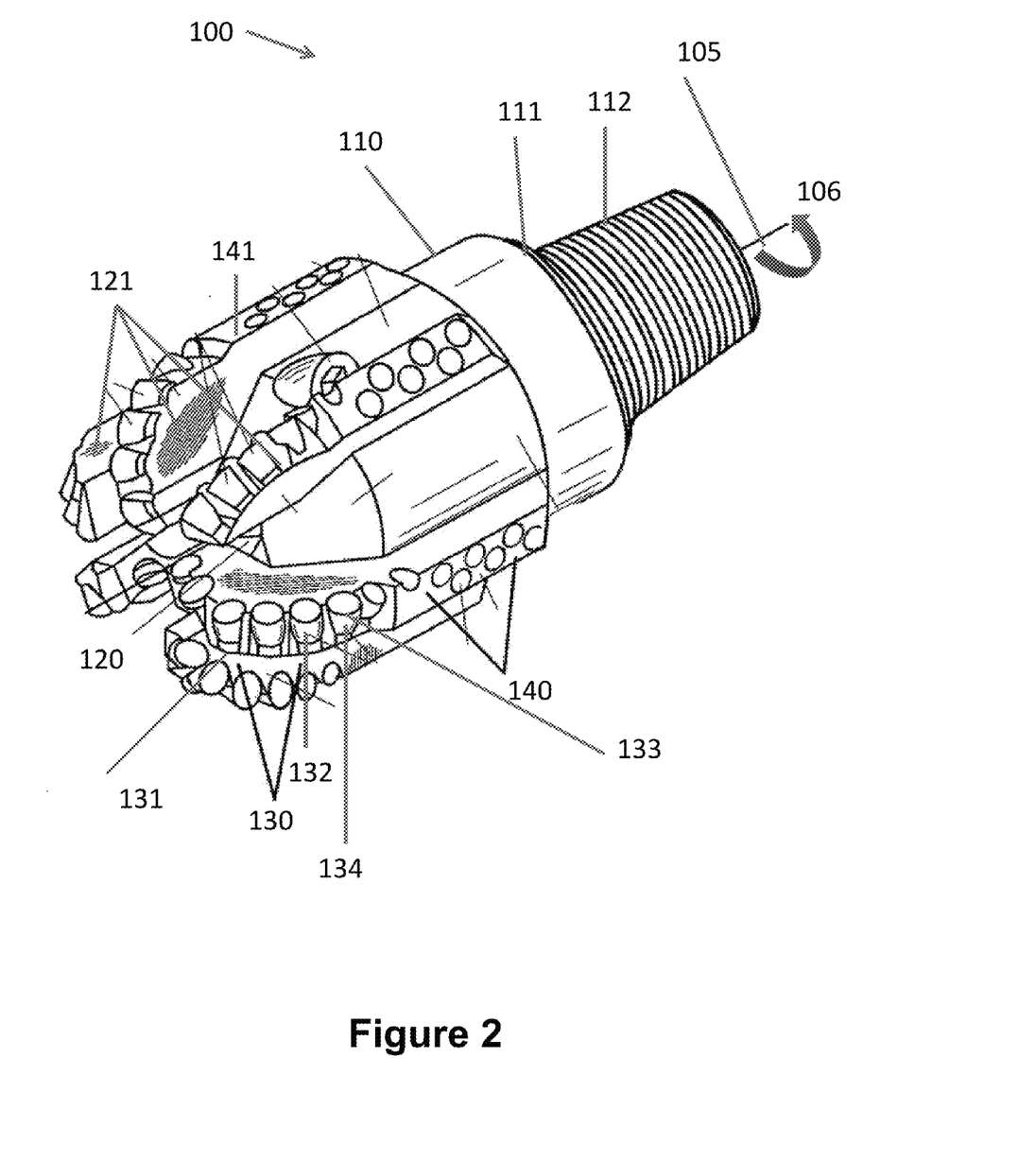
FIG. 2 is a perspective view of an embodiment of a fixed cutter drill bit made in accordance with principles described herein.

Referring now to FIG. 2, an embodiment of a downhole tool 100 in accordance with the principles described herein is shown. In this embodiment, tool 100 is a fixed cutter PDC bit adapted for drilling through formations of rock to form a borehole. Bit 100 has a central axis 105 about which it is rotated in a cutting direction 106 to drill the borehole. In addition, bit 100 includes a bit body 110, a shank 111, and an externally threaded connection or pin 112 attached to shank 111. Pin 112 connects bit 100 to a drill string (not shown). Bit body 110 has a bit face 120 formed on the end of the bit 100 that faces the formation and is generally opposite pin 112.

A cutting structure 121 is provided on face 120 and includes a plurality of circumferentially-spaced blades 130 that extend from bit face 120. In this embodiment, cutting structure 121 includes six angularly-spaced blades 130. Blades 130 are integrally formed as part of, and extend from, bit body 110 and bit face 120. Each blade 130 includes a cutter-supporting surface 131 for mounting a plurality of cutter elements 132. Each cutter element 132 comprises a cutting face 133 attached to an elongated and generally cylindrical support member or substrate 134, which is received and secured in a pocket formed in surface 131 of the corresponding blade 130 to which it is fixed. Each cutting face 133 is made of a very hard material, such as a polycrystalline diamond material, suitable for engaging and shearing the formation.

Figure 3:
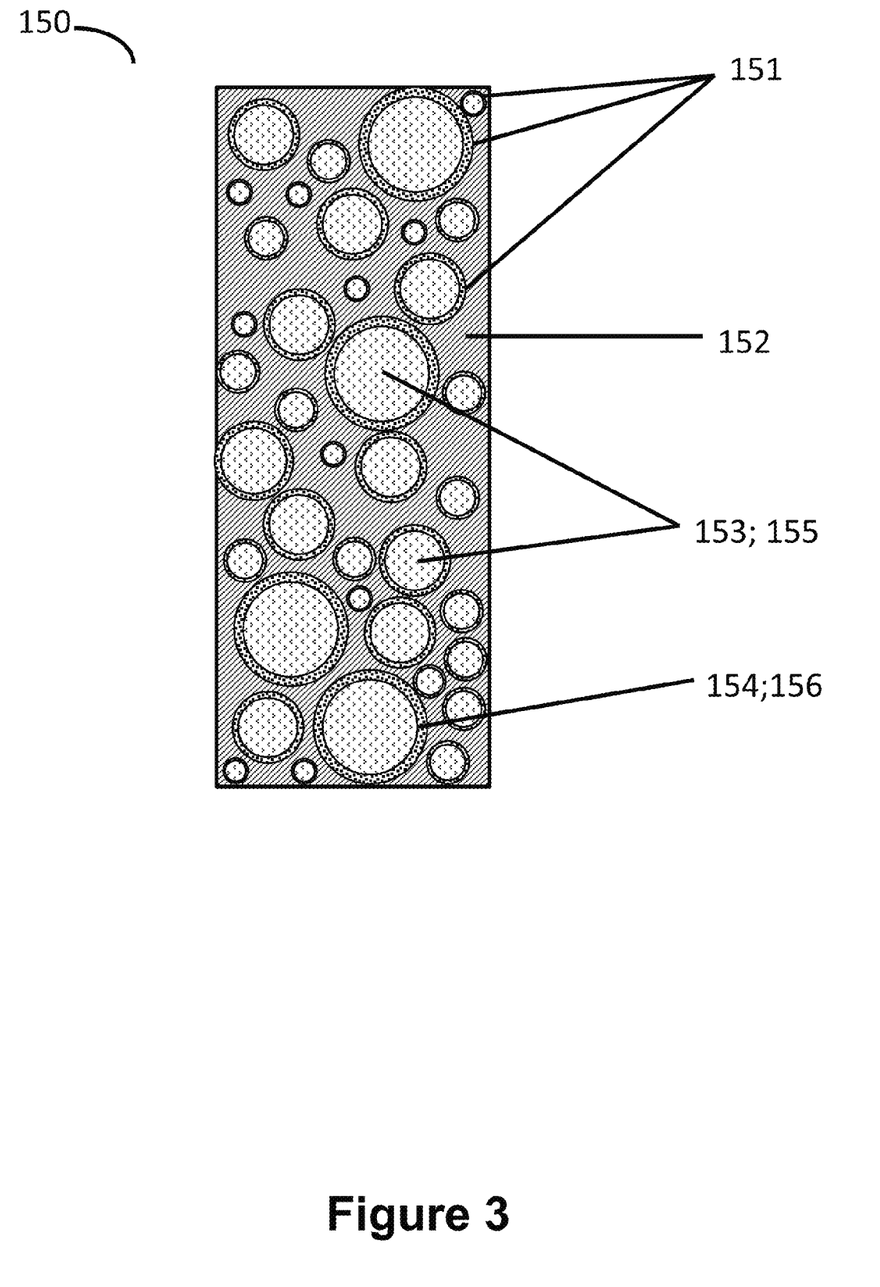
FIG. 3 is a schematic cross-sectional view of the hard-facing of FIG. 2

Referring to FIGS. 2 and 3, bit 100 also includes circumferentially-spaced gage pads 140 disposed about the circumference of bit 100. In this embodiment, gage pads 140 are integrally formed as part of the bit body 110, with each gage pad 140 extending axially from a corresponding blade 130. Each gage pad 140 has a radially outer gage-facing surface 141 that slidingly engages the borehole sidewall during drilling to help maintain the size of the borehole and stabilize bit 100 against vibration. In certain embodiments, gage pads 140 include flush-mounted or protruding cutter elements embedded in gage-facing surfaces 141 to resist pad wear and assist in reaming the borehole sidewall.

To enhance the durability and operating liftetime of bit 100, select regions of bit body 110 are provided with a layer or coating of hard-facing 150. Since formation facing surfaces 131 of blades 130 and gage-facing surfaces 141 of pads 140 are particularly susceptible to wear and damage, in this embodiment, the entire formation facing surface 131 of each blade 130 comprises a layer of hard-facing 150 and the entire gage-facing surface 141 of each gage pad 140 comprises a layer of hard-facing 150. In other embodiments, additional surfaces of the bit body (e.g., bit body 110) can comprise layer(s) of hard-facing (e.g., hard-facing 150).

Hard-Facing 150

Figure 4:
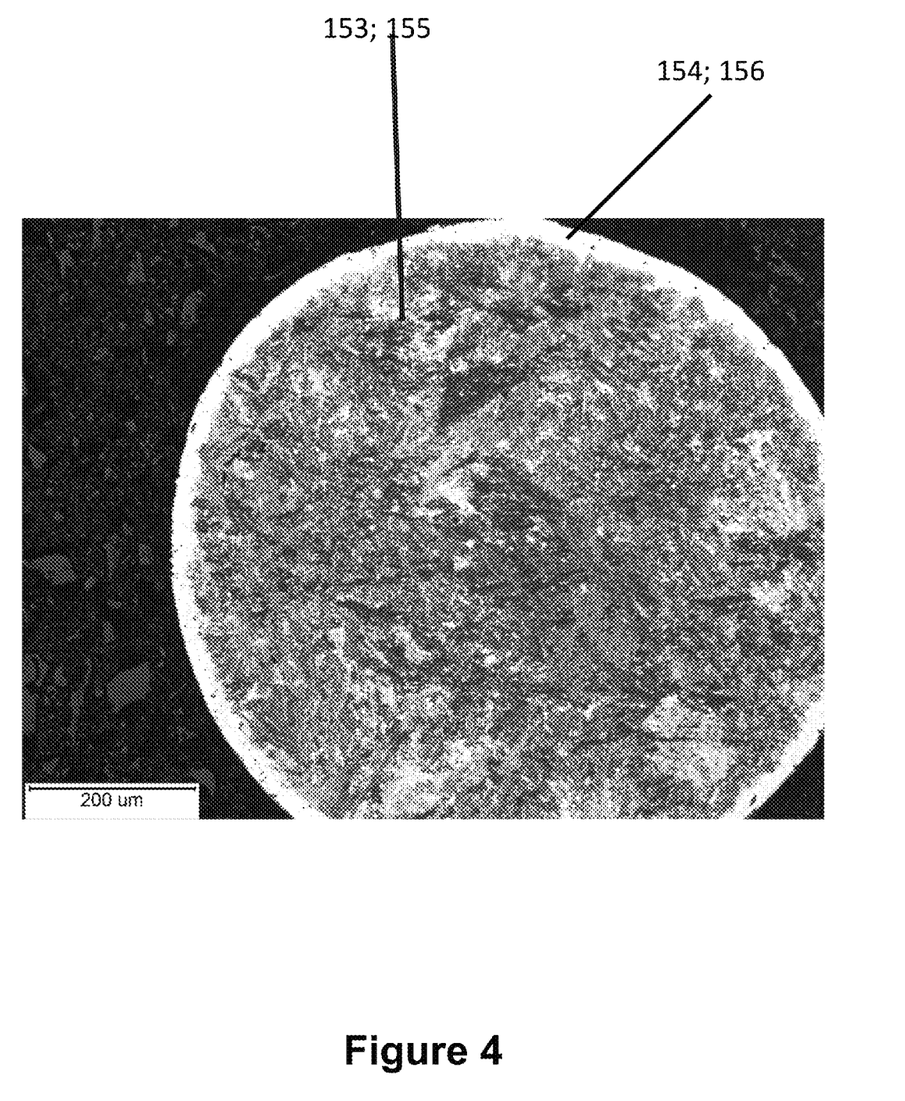
FIG. 4 is a light image of a spherical cast carbide pellet (or particle) made in accordance with principles described herein.
Figure 5:
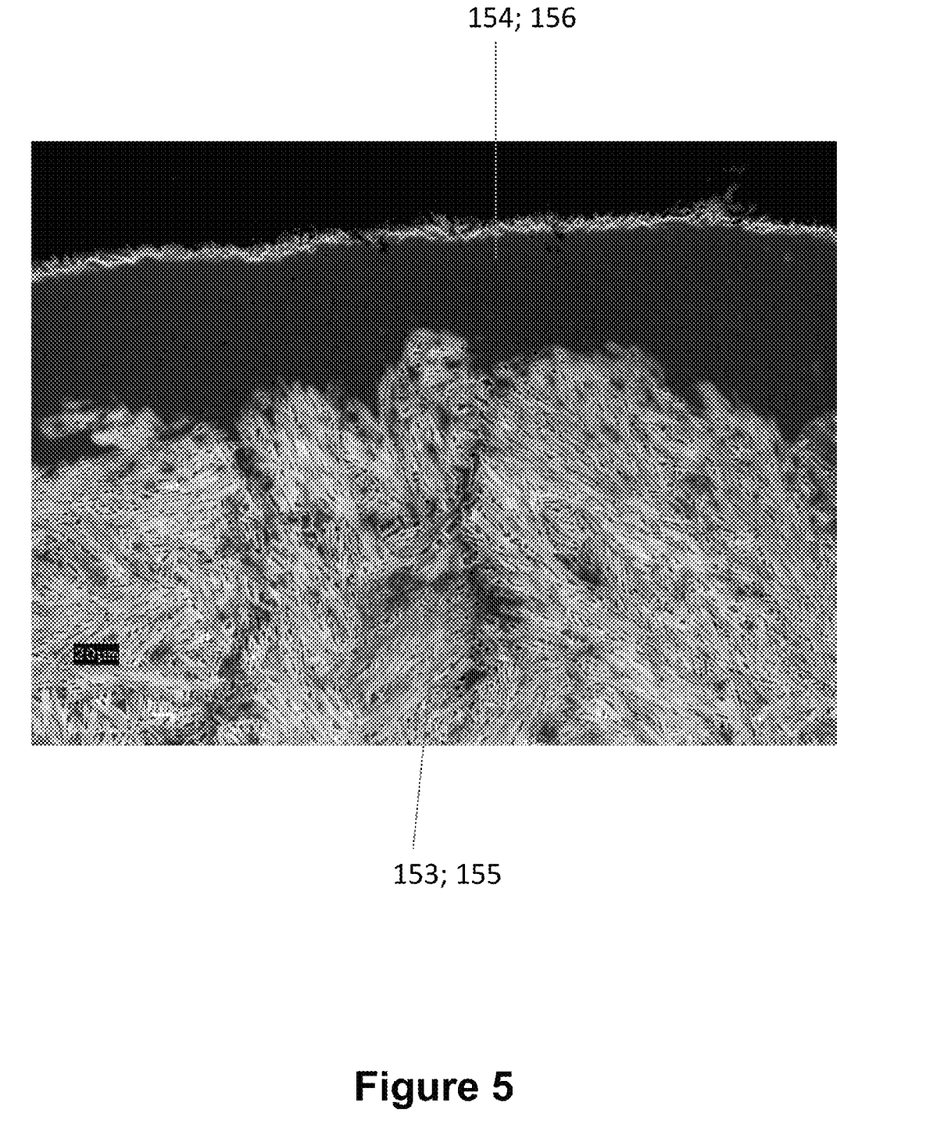
FIG. 5 is an (Scanning Electron Microscope) SEM image of the microstructure of the spherical cast carbide pellet of FIG. 4.

Referring now to FIGS. 3-5, in this embodiment, hard-facing 150 is a composite material comprising a plurality of spherical cast tungsten carbide (WC/$W_2C$) pellets 151 distributed throughout a metal alloy matrix 152. For most applications, the metal alloy matrix 152 is preferably a Ni-, Co-, or Fe-alloy matrix. Each spherical cast tungsten carbide pellet 151 includes an inner core 153 and an outer shell 154 surrounding the core 153. Inner core 153 is made of a first or core material 155 and outer shell 154 is made of a second or shell material 156 that is different than core material 155. Thus, each pellet 151 can be described as comprising a composite material, wherein a composite material is a material made of two or more different materials. Shell material 156 comprising the shell, has a preferable thickness of about 0.1-35.0 microns.

First/Core Material 155

Referring still to FIGS. 4 and 5, in this embodiment, core material 155 consists of grains of eutectic tungsten carbide ($WC/W_2C$) having a plate or needle-like structures, and comprise the core structure 153. More specifically, each grain of tungsten carbide of core material 155 has an elongate microstructure with a thickness less than about 2.0 microns, and more preferably 0.5 to 2 microns, wherein said thickness is measured by high magnification SEM, and an aspect ratio (length/thickness) of about 0.1-1000.0, about 1.0-500.0, 10-100, 20-100, preferably about 50.0-100.0; and more preferably 20-60. Table 1 below provides some examples of suitable geometries for the microstructure of the crystals/grains of tungsten carbide in core material 155. Although core material 155 consists of grains/crystals of eutectic tungsten carbide ($WC/W_2C$) having a plate or needle-like structures in this embodiment, in other embodiments, the core material (e.g., core material 155) can comprise grains/crystals of eutectic tungsten carbide ($WC/W_2C$) having a blocky microstructure.

TABLE 1

| | Thickness of single needle (um) | Aspect ratio (length/thickness) | Vicker's hardness (HV) |
|---|---|---|---|
| SAMPLE- A | 0.62 | 54.46 | 2223 |
| SAMPLE-C | 0.48 | 49.08 | 2250 |
| SAMPLE-D | 0.78 | 40.62 | 2250 |
| SAMPLE-G | 0.58 | 32.36 | 2098 |
| SAMPLE-B | 0.67 | 26.58 | 2302 |

As previously described, core material 155 consists of eutectic tungsten carbide ($WC/W_2C$). In some embodiments, the tungsten carbide in core material 155 is preferably about 60-90 wt %, di-tungsten carbide ($W_2C$), with the balance being mono-tungsten carbide (WC), and more preferably about 70-80 wt % di-tungsten carbide ($W_2C$), with the balance being mono-tungsten carbide (WC). In other embodiments, the tungsten carbide in core material 155 is preferably about 50-65 wt % di-tungsten carbide ($W_2C$), with the balance being mono-tungsten carbide (WC), and more preferably about 55-62 wt % di-tungsten carbide ($W_2C$), with the balance being mono-tungsten carbide (WC). In yet other embodiments, the tungsten carbide in core material 155 is preferably about 10-40 wt % mono-tungsten carbide (WC), with the balance being di-tungsten carbide ($W_2C$), and more preferably about 20-37 wt % mono-tungsten carbide (WC), with the balance being di-tungsten carbide ($W_2C$). In addition, the tungsten carbide in core material 155 is preferably about 1.0-10.0 wt % Carbon, more preferably about 2.0-7.0 wt % carbon, and even more preferably about 3.8-4.2 wt % carbon. Exemplary compositions of commercial cast carbide are shown below in Table 2.

TABLE 2

| Sample | $W_2C/WC$ Ratio | WC % | $W_2C$ % |
|---|---|---|---|
| 1 | 1.7 | 37.3 | 62.7 |
| 2 | 2.6 | 19.2 | 49.8 |
| 3 | 2.5 | 21.2 | 53.1 |
| 4 | 4.9 | 11.9 | 58 |

TABLE 2-continued

| Sample | $W_2C/WC$ Ratio | WC % | $W_2C$ % |
|---|---|---|---|
| 5 | 2.1 | 29.1 | 60.1 |
| 6 | 1.6 | 39.1 | 60.9 |
| 7 | 1.6 | 38.5 | 61.5 |

Second/Shell Material 156

In this embodiment, shell material 156 consists of fine grains/crystals of carburized mono-tungsten carbide (WC) having widths of 0.1-10.0 microns. In some embodiments the grains/crystals may be equiaxial.

As previously described, pellets 151 comprise spherical cast tungsten carbide ($WC/W_2C$), which generally has a Vickers hardness of about 1200-3000, about 1500-2500, or about 1800-2200. In general, spherical cast tungsten carbide ($WC/W_2C$) has a greater hardness than cast and crushed tungsten carbide ($WC/W_2C$), which in turn has greater hardness than macro-crystalline tungsten carbide (WC); and further, spherical cast tungsten carbide ($WC/W_2C$) has a greater toughness than cast and crushed tungsten carbide ($WC/W_2C$), which in turn has a higher toughness than macro-crystalline tungsten carbide (WC).

Figure 6:
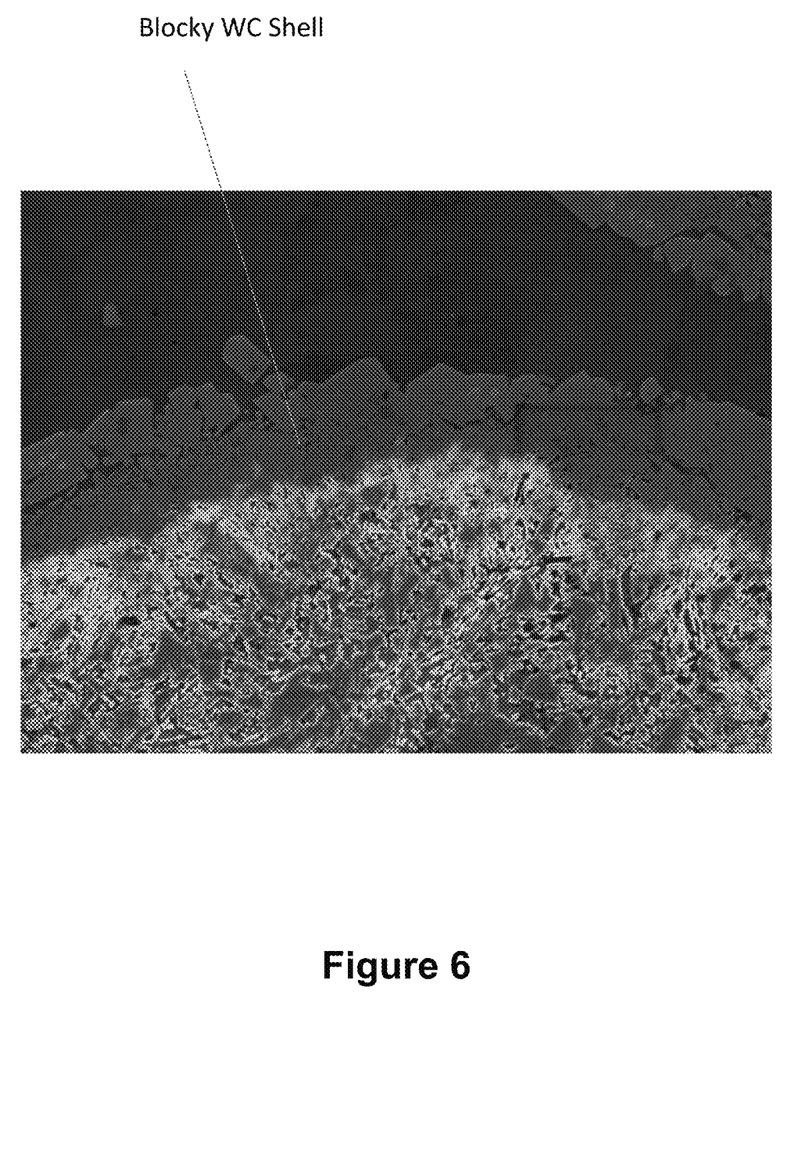
FIG. 6 is an SEM image of a conventional cast carbide pellet (or particle)

Spherical cast tungsten carbide has been successfully used for hard-facing materials for PDC bits and downhole tools using flame spray, laser cladding and plasma transferred arc (PTA) techniques. Application with such high energy input devices often results in the dissolution of some tungsten carbide in the Ni-, Co-, and Fe-alloy matrix. Such dissolution can be detrimental to the mechanical properties of the resulting hard-facing and often leads to cracks in the hard-facing. As shown in FIG. 6, the spherical cast tungsten carbide conventionally used in hard-facing has a microstructure that comprises block like WC crystals, such a geometry is prone to such alloying, under such conditions described above. However, in embodiments described herein, spherical cast tungsten carbide (WC/W2C) pellets 151 including an inner core 153 and an outer shell 154 as previously described, offer the potential to reduce and minimize the dissolution of tungsten carbide in the alloy matrix, thereby improving the mechanical properties and durability of hard-facing 150 as compared to conventional hard-facing. In particular, the method herein described produces a composite material that comprises of the core material and the shell material of WC, wherein the low temperature of carburization maintains the $WC/W_2C$ core microstructure as needle like grains or crystals. These needle like structures thus imparts a greater hardness to the composite material described herein.

Method for Making Pellets 151

Figure 9:
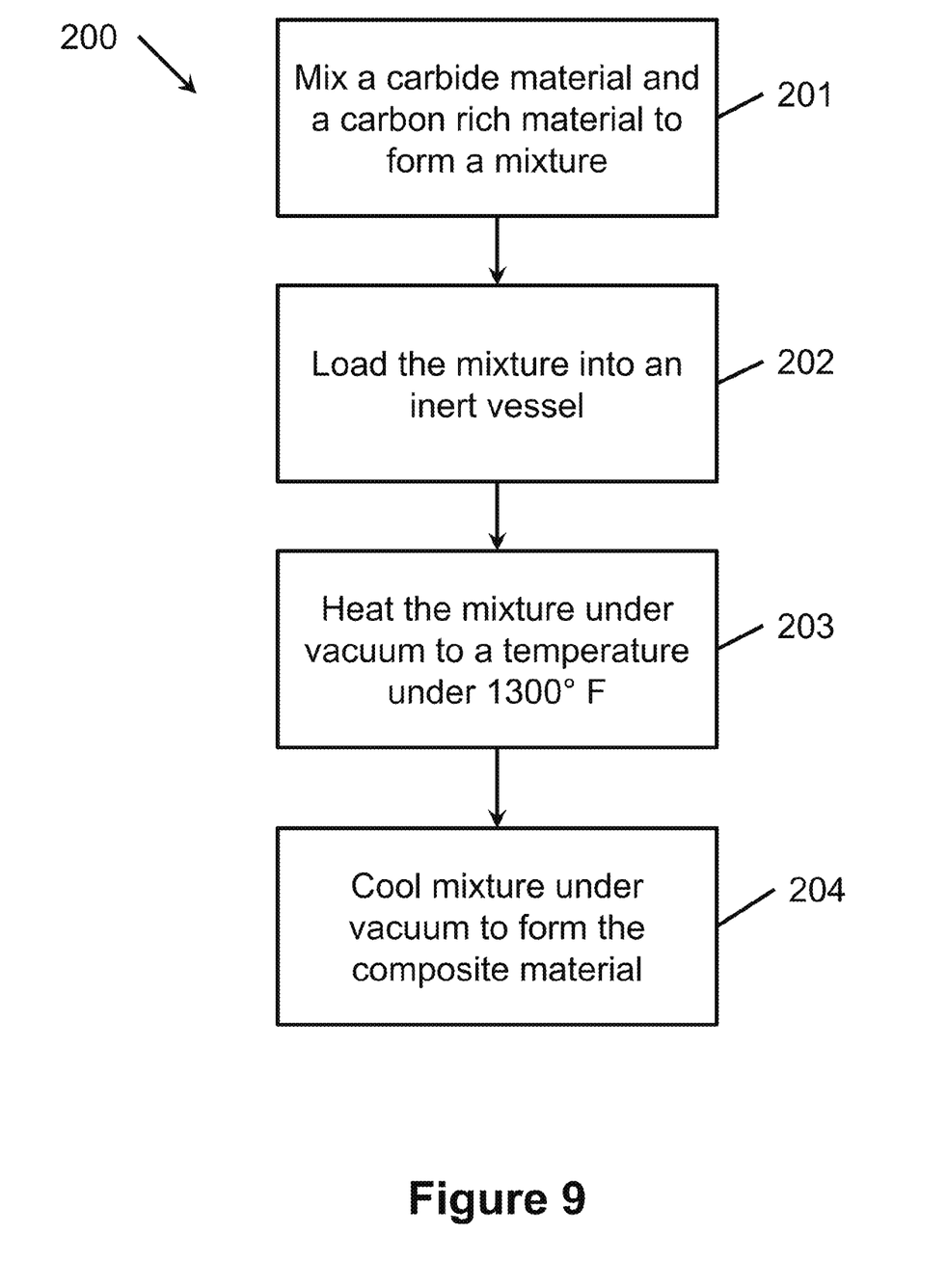
FIG. 9 is a flow chart illustrating an embodiment of a method for making WC shelled spherical cast carbide pellets in accordance with principles described herein.

Referring now to FIG. 9, an embodiment of a method 200 for making composite spherical cast tungsten carbide (WC/$W_2C$) pellets 151 as previously described is schematically shown. Beginning in block 201 of method 200, a carbide material and a carbon rich material are combined and mixed together. In this embodiment, the carbide material is eutectic tungsten carbide ($WC/W_2C$) comprising about 55-62 wt % di-tungsten carbide ($W_2C$), with the balance being mono-tungsten carbide (WC). In another embodiment, the carbide material is about 20-37% (wt) mono-tungsten carbide (WC), with the balance being di-tungsten carbide ($W_2C$). In this embodiment, the carbide material is powdered spherical eutectic tungsten carbide ($WC/W_2C$). In other words, the individual particles of eutectic tungsten carbide ($WC/W_2C$)

are spherical, preferably having a size (in some embodiments a diameter) of about 50-1200 microns.

Figure 7:
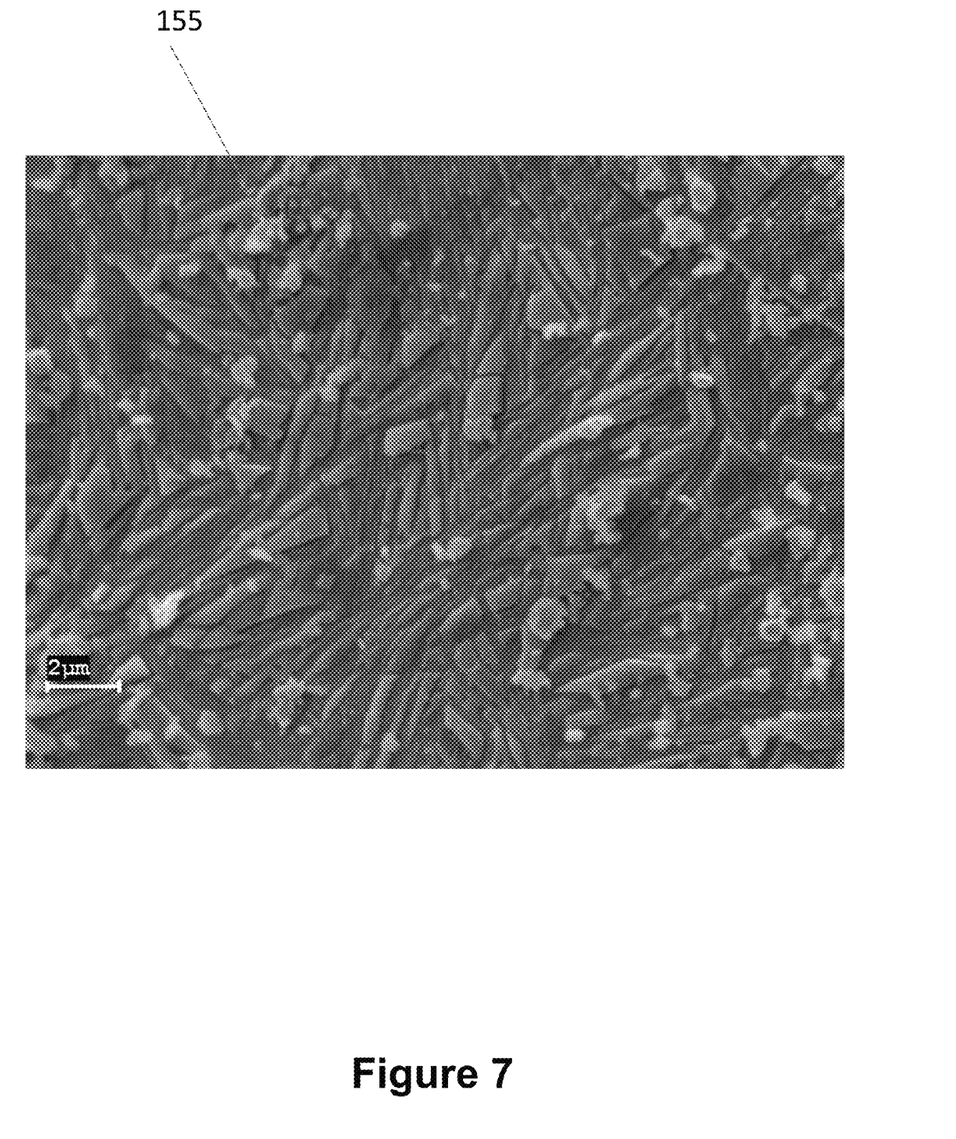
FIG. 7 is an SEM image of the surface morphology of a spherical cast carbide pellet prior to forming a WC shell.
Figure 8:
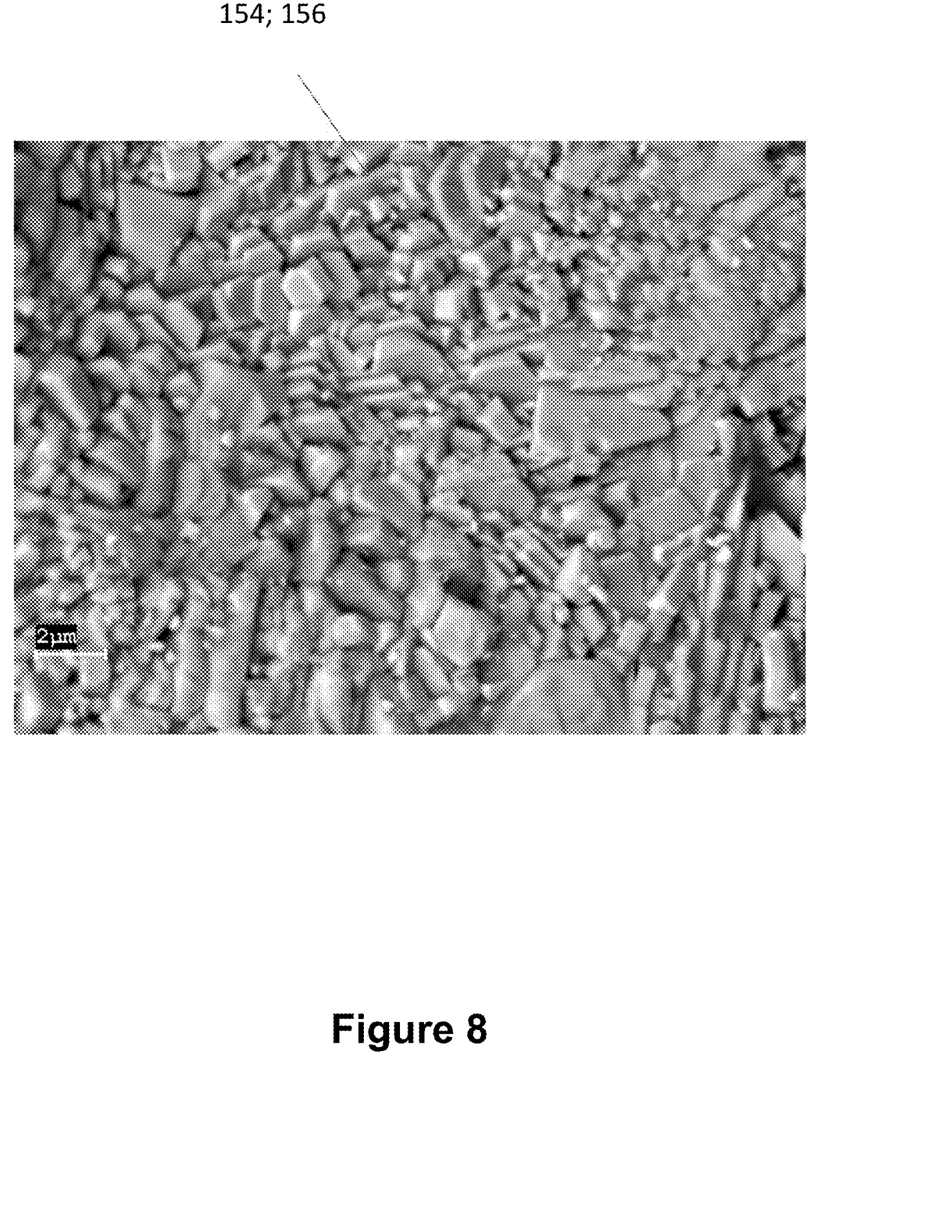
FIG. 8 is an image of the surface morphology of the WC shell with equiaxial grains made in accordance with principles described herein.

The carbon rich material in the mixture formed in block 201 is preferably air, a carbon rich gas; CO, $CO_2$, CO/CO, alkanes, alkenes, coarse carbon black, fine carbon black, or combinations thereof. In this embodiment, the carbon rich material includes fine carbon black. More specifically, the mixture formed in block 201 preferably comprises about 1.0-4.0% (wt) fine carbon black, and more preferably comprises about 2.0-4.0% (wt) fine carbon black. The fine carbon black has a size of about 0.1-100.0 microns. Referring still to FIG. 9, the mixture formed in block 201 is loaded into an inert vessel in block 202 (e.g., an $Al_2O_3$ boat), and then, is heated under vacuum to a temperature less than 1300° F. in block 203. In one embodiment the temperature is about 1200-1300° F. Such a temperature is to prevent the plate-like or needle-like WC/$W_2$C microstructure from coarsening into a blocky structure as shown in FIGS. 7 and 8. The heating in block 203 is preferably for about 1-24 hours, more preferably for about 2-12 hours, and even more preferably less than about 8 hours. Next, in block 204, the mixture is allowed to cool under vacuum resulting in the formation of composite spherical cast tungsten carbide (WC/$W_2$C) pellets 151. Pellets 151 formed in method 200 can then be blended with a metal alloy matrix 152 as previously described and applied to a downhole tool (e.g., bit 100) using conventional techniques (e.g., flame spray, laser cladding and plasma transferred arc) to form hard-facing 150 on the downhole tool.

The following examples, conditions and parameters are given for the purpose of illustrating certain exemplary embodiments of the present invention.

EXAMPLES

Example 1

Production of spherical cast tungsten carbide (WC/$W_2$C) pellets (e.g., pellets 151) in accordance with principles described herein.

In one embodiment herein described, spherical cast carbide pellets with size of 700-1200 μm were carburized in a CO/$CO_2$ gas at 1750° F. (954° C.) for 16 hours. The WC shell thickness was measured to be about 2 μm.

Example 2

Production of spherical cast tungsten carbide (WC/$W_2$C) pellets (e.g., pellets 151) In an embodiment herein described, and illustrated in the flow chart of FIG. 9, spherical cast carbide pellets with a size of 700-1200 μm was mixed with coarse carbon black (100-650 μm in size) in a $Al_2O_3$ boat under vacuum at 2500° F. (1371° C.) for 16 hours. The WC shell thickness was not measurable, as the product was insufficiently carburized. It was thus elucidated that coarse carbon black of 100-650 μm particle size is not a good carbon source for carburizing cast carbide pellets due to its large size resulting in low surface contacts with the carbide spherical pellets.

Example 3

Production of spherical cast tungsten carbide (WC/$W_2$C) pellets (e.g., pellets 151) in accordance with principles described herein.

In an embodiment described herein and produced by an embodiment illustrated by the flow chart of FIG. 9, spherical cast carbide pellets with a size of 700-1200 μm was mixed with 4 wt % fine carbon black (about 0.1 to about 100 μm particle size) in an $Al_2O_3$ boat, under vacuum at 2500° F. (1371° C.) for 16 hours. The WC shell thickness was measured to be about 24 μm. In reference to Example 2, the particle size of the carbon black had predominated effect on the formation of WC layer, and its thickness, due to the degree of interaction of the starting particles of carbon place and the spherical core, i.e. the finer particles having greater contact with the WC/$W_2$C core to thereby form a shell of WC by solid state diffusion. The carburization temperature and the length of heating in some embodiments control the form of the core microstucture producing plate or needle like core microstructure and fine equiaxial WC grains in the shell (FIG. 5) in contrast to the prior art disclosed in FIG. 6 (block like microstructure). I.e. in some embodiments, heating at a lower temperature of less than 1300 degrees F., and for less than 8 hrs produces a WC shell of a thickness of between 1 and 10 microns, while maintaining a needle or plate like microstructure within the WC/$W_2$C core.

Example 4

Production of spherical cast tungsten carbide (WC/$W_2$C) pellets (e.g., pellets 151) in accordance with principles described herein.

In an embodiment described herein, spherical cast carbide pellets with size of 150-250 μm were mixed with 2 wt. % (4a) or 4 wt. % (4b) carbon black N220. The mixture was heated in a vacuum furnace at 2300° F. (1260° C.) for 8 hours. A carburized shell of 3-9 um thick was achieved during the carburization process. The powder mixture was taken out after the furnace cooled down slowly. To remove excessive carbon black powder, the carburized powder mixture was dispersed into ethanol, in which carbon black dissolved and the liquid was discarded. Several cleaning cycles were repeated until no obvious carbon black powder was observed. The carburized tungsten carbide powder was allowed to dry overnight at room temperature.

Example 5

Hard-Facing Wear Test

The spherical cast carbide pellets made in accordance with the principles described herein (e.g., pellets 151) were blended with 35 wt. % Ni—Si—B alloy powder and then flame sprayed on 4330 steel blocks. ASTM G65 wear test was conducted on the above sprayed hard-facing of the blocks for 6,000 revolutions. The wear resistance of the hard-facing are summarized in Table 3, the hard-facing containing carburized WC/$W_2$C has much better wear resistance than that of the untreated sample.

TABLE 3

Wear resistance of hard-facings made by embodiments described herein:

| Hard-facing | WC/$W_2$C | Weight loss (g) |
|---|---|---|
| Sample-A | Uncarburized | 0.180 |
| 4a | Carburized with 2% carbon black | 0.091 |
| 4b | Carburized with 4% carbon black | 0.130 |

Summary of Features and Advantages

As such embodiments of the invention described herein provide for various methods to carburize spherical cast pellets forming a WC shell, wherein the composite material formed has improved wear resistance and fracture toughness.

Embodiments herein thus provide a composite material, and a process for producing such a composite material, wherein selected embodiments of temperature and time are employed to maintain fine needle-like or plate of core microstructure of WC/W$_2$C, and to form a shell in some embodiments of fine (often equiaxial) WC particles. A combination of a shell of WC, having a desired thickness, and a WC/W$_2$C core structure comprising needle or plate like WC/W$_2$C crystals reduce cast carbide alloying and improve abrasion resistance and toughness of hard-facing and bit matrix.

In one embodiment of the method of making a composite material, the composite material is a matrix drill body, and in a further embodiment, the composite material is a hard-facing surface, in other embodiments the composite material may be applied to any surface in need of improved fracture toughness, and or wear resistance, such as but not limited to down hole drilling equipment or tools.

Therefore it is believed that the composite materials made by the methods described herein and exemplified in examples described herein, will impart to a hard-facing material, a matrix material, and such down hole tools as drill bit bodies and wear surfaces to which said materials are applied, improved wear resistance and fracture toughness as compared to some conventional composite materials, matrix and bit bodies and wear surfaces.

While preferred embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the invention. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A composite material comprising:
   a first material comprising a plurality of grains of eutectic WC and W2C, wherein each of the plurality of grains of the first material has an elongated microstructure with a thickness less than about 2 microns and an aspect ratio of about 10 to about 100; and
   a second material comprising a shell around said first material, wherein said shell has a thickness of about 0.1 micron to about 35 micron.

2. The composite material of claim 1, wherein said first material comprises about 10 wt. % WC to about 40 wt. % WC.

3. The composite material of claim 2, wherein said first material comprises about 20 wt. % WC to about 37 wt. % WC.

4. The composite material of claim 1, wherein said first material comprises about 50 wt. % W2C to about 65 wt. % W2C.

5. The composite material of claim 4, wherein said first material comprises about 55 wt. % W2C to about 62 wt. % W2C.

6. The composite material of claim 1, wherein said first material comprises about 3.8 wt. % to about 4.2 wt. % of carbon.

7. The composite material of claim 1, wherein said first material comprises an inner core structure.

8. The composite material of claim 7, wherein said inner core is spherical.

9. The composite material of claim 8, wherein said inner core structure comprises a needle like or a plate like elongated microstructure.

10. The composite material of claim 1, wherein said second material comprises WC.

11. The composite material of claim 1, wherein said composite material comprises a Vickers hardness of 1800 to 3000.

12. A method of making a composite material comprising:
    mixing:
      a carbide material, wherein said carbide material comprises a plurality of grains of carbide material, wherein each of the plurality of grains of the carbide material has an elongated microstructure with a thickness less than about 2 microns and with an aspect ratio of about 10 to about 100; and
      a carbon rich material, to form a first mixture;
    heating said mixture under vacuum; and
    cooling said mixture under vacuum to form a composite material.

13. The method of claim 12, wherein said carbide material is eutectic WC/W2C.

14. The method of claim 12, wherein said carbide material comprises about 55 wt. % W2C to about 62 wt. % W2C.

15. The method of claim 12, wherein said carbide material comprises about 20 wt. % WC to about 37 wt. % WC.

16. The method of claim 12, wherein said carbide material further comprises spherical particles.

17. The method of claim 16, wherein the spherical particles are about 50 microns to 1200 microns in size.

18. The method of claim 12, wherein said carbon rich material is at least one of: air, a carbon rich gas; CO, CO2, CO/CO2, alkanes, alkenes, coarse carbon black, or fine carbon black.

19. The method of claim 18, wherein said carbon rich material is fine carbon black.

20. The method of claim 19, wherein said fine carbon black comprises about 1 wt % to about 4 wt. % of the mixture.

21. The method of claim 19, wherein said carbon black is about 0.1 microns to about 100 microns in size.

22. The method of claim 12, wherein said heating is for about 1 to about 24 hrs.

23. The method of claim 12, wherein said heating is for less than about 8 hrs.

24. The method of claim 12, further comprises after said mixing, placing said mixture in an inert vessel.

25. The method of claim 12, wherein said composite material comprises a spherical inner core structure; and further comprises an outer shell, wherein said shell is about 2 micron to about 10 microns thick.

26. The method of claim 25, wherein said shell is about 5 microns to about 7 microns thick.

27. The method of claim 25, wherein said spherical inner core structure comprises WC/W2C.

28. The method of claim 25, wherein said shell is comprises WC.

29. The method of claim 27, wherein said spherical inner core structure comprises a needle like or a plate like elongated microstructure.

30. The method of claim 25, wherein said spherical inner core structure is about 50 microns to about 1200 microns in size.

31. The method of claim 30, wherein said spherical inner core structure is about 100 microns to about 300 microns in size.

32. The method of claim 25, wherein said spherical inner core structure has a Vickers hardness number of greater than 2000, and wherein said shell has a Vickers hardness number of 1800 to 3000.

33. The method of claim 12, wherein said composite material is a matrix drill body.

34. The method of claim 12, wherein said composite material is a hard-facing surface.

35. A drill bit for drilling a borehole in earthen formations comprising:
   a bit body;
   a coating applied to at least a portion of the bit body, wherein the coating is a composite material comprising:
      a first material comprising a plurality of eutectic WC and W2C, wherein each of the plurality of grains of the first material has a needle-like structure with a thickness less than about 2 microns and with an aspect ratio of about 10 to about 100; and
      a second material comprising a shell around said first material, wherein said shell has a thickness of about 0.1 micron to about 35 micron.

36. The composite material of claim 1, wherein said first material comprises a spherical inner core structure having a size about 100 microns to about 300 microns; and
   wherein said shell has a thickness of about 2 micron to about 10 microns.

* * * * *